J. BOYD & R. O. CROWLEY.
Electrical Water-Indicator for Steam-Boilers.
No. 224,068. Patented Feb. 3, 1880.
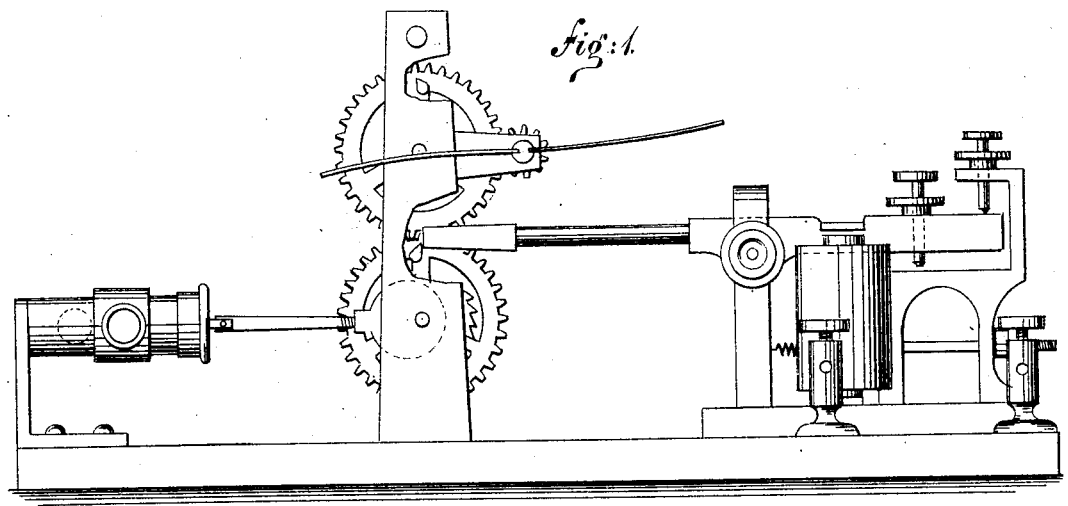
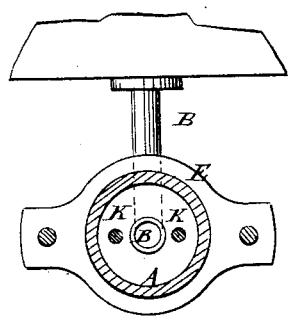
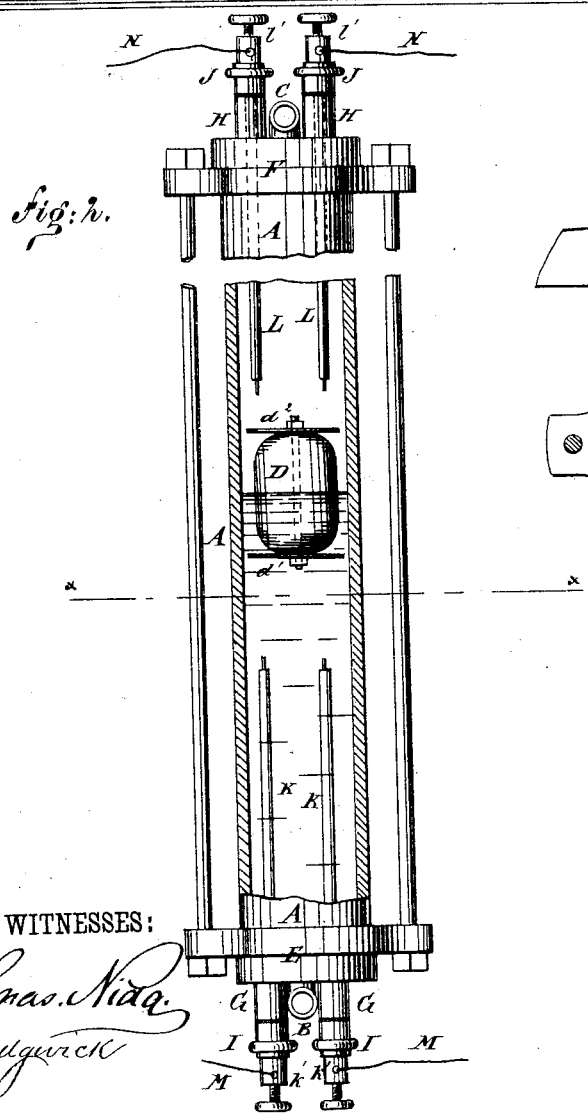
WITNESSES:
Chas. Nida
C. Sedgwick
INVENTOR:
J. Boyd
R. O. Crowley
BY Munn & Co.
ATTORNEYS.

UNITED STATES PATENT OFFICE.

JOHN BOYD, OF BALTIMORE, MD., AND ROY O. CROWLEY, OF NEW YORK, N. Y.

ELECTRICAL WATER-INDICATOR FOR STEAM-BOILERS.

SPECIFICATION forming part of Letters Patent No. 224,068, dated February 3, 1880.

Application filed July 1, 1879.

*To all whom it may concern:*

Be it known that we, JOHN BOYD, of Baltimore, in the county of Baltimore and State of Maryland, and ROY O. CROWLEY, of the city, county, and State of New York, have invented a new and useful Improvement in Electric Water Governor and Indicator for Steam-Boilers, of which the following is a specification.

Figure 1 is a side view of an apparatus for connecting our device with the feed-water pipe of a steam-boiler. Fig. 2 is a side view of the device, partly in longitudinal section to show the construction. Fig. 3 is a cross-section of the same, taken through the line $x\,x$, Fig. 2.

The object of this invention is to furnish an improved device by means of which changes in the height of the water in a steam-boiler may operate an electro-magnetic apparatus to open and close the feed-water pipe of a steam-boiler, to admit and shut off the feed-water automatically, as required, and to sound an alarm, and which shall be simple in construction and reliable in use, not being liable to get out of order.

The invention consists in the combination of the float and the two sets of conducting-wires provided with the sockets and set-screws, the insulating-tubes provided with the stuffing-boxes, and the caps, with the glass tube provided with the tubes for connecting it with the water and steam spaces of a boiler, for opening and closing the circuit of a galvanic battery to operate an electro-magnetic apparatus to open and close the valve in the feed-water pipe of a steam-boiler, and to sound an alarm, as hereinafter fully described.

Similar letters of reference indicate corresponding parts.

A is a glass tube, the lower end of which is connected with the water-space of a steam-boiler by a pipe, B, and its upper end is connected with the steam-space of the said boiler by a pipe, C, so that the water will stand at the same height in the tube A that it does in the boiler. Within the tube A is placed a float, D, made of thin sheet metal or other suitable material, and which has metal disks $d'\,d^2$ attached to its lower and upper ends. The float D and its disks $d'\,d^2$ are made a little smaller than the cavity of the tube A, so as to move up and down freely within the said tube. The tube A and float D thus form a good indicator, as the said float is more readily seen than the surface of the water in the ordinary indicator. The ends of the glass tube A are closed by caps E F, in which are secured short tubes G H, two to each, made of some suitable non-conducting material. The tubes G H are provided with stuffing-boxes I J, through which pass wires K L, which are thus insulated from each other and the caps E F. The inner parts or ends of the wires K L are made of platinum, and their outer ends are provided with sockets and set-screws $k'\,l'$, for receiving and holding the circuit-wires M N of a battery. The two sets M N of wires may both be connected with the same battery, and the circuit is closed by either of the disks $d'\,d^2$ coming in contact with either set of the wires K L. The circuit-wires of the battery are designed to be connected with an electro-magnetic apparatus connected with a valve in the feed-water pipe of the boiler, and so constructed that the closing of the electric circuit will close the valve and the opening of the electric circuit will open the said valve.

With this construction, when the proper amount of water has been received in the boiler, the upper disk, $d^2$, of the float D comes in contact with the ends of the wires L, closing the circuit and closing the valve to shut off the water from the boiler. As the water in the boiler lowers the float D sinks away from the wires L, which breaks the circuit and opens the valve to again admit water until the float D again rises and closes the circuit. If, from any cause, water should not enter the boiler when the valve is opened, the float will continue to sink until its lower disk, $d'$, comes in contact with the lower wires, K, which closes the circuit and sets an alarm apparatus in motion. The alarm apparatus may be located in any convenient place, or several alarm apparatus in different places may be connected together and set in motion at the same time, so that the boiler may receive attention before the water becomes so low as to be dangerous.

As the water again rises in the boiler the float D rises, ready to close the valve by closing the circuit when the boiler again contains the proper amount of water.

Having thus fully described our invention, we claim as new and desire to secure by Letters Patent—

The combination of the float D and the two sets of conducting-wires K L, provided with the sockets and set-screws $k'$ $l'$, the insulating-tubes G H, provided with the stuffing-boxes I J, and the caps E F, with the glass tube A, provided with the tubes B C for connecting it with the water and steam spaces of a boiler, for opening and closing the circuit of a galvanic battery to operate an electro-magnetic apparatus to open and close the valve in the feed-water pipe of a steam-boiler, and to sound an alarm, substantially as herein shown and described.

JOHN BOYD.
ROY O. CROWLEY.

Witnesses to the signature of John Boyd:
THOS. M. NORRIS,
MOSES NORRIS.

Witnesses to the signature of Roy O. Crowley:
JAMES T. GRAHAM,
CHAS. SEDGWICK.